United States Patent
Hamaoka et al.

(10) Patent No.: US 11,909,064 B2
(45) Date of Patent: Feb. 20, 2024

(54) PRESSURE CONTROL VALVE STRUCTURE AND POWER STORAGE MODULE

(71) Applicant: KABUSHIKI KAISHA TOYOTA JIDOSHOKKI, Kariya (JP)

(72) Inventors: Satoshi Hamaoka, Aichi-ken (JP); Taku Inoue, Aichi-ken (JP); Hiromi Ueda, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 275 days.

(21) Appl. No.: 17/099,172

(22) Filed: Nov. 16, 2020

(65) Prior Publication Data
US 2021/0159475 A1    May 27, 2021

(30) Foreign Application Priority Data

Nov. 26, 2019 (JP) .................................. 2019-213039

(51) Int. Cl.
*H01M 50/325* (2021.01)
*H01M 10/0525* (2010.01)

(52) U.S. Cl.
CPC ..... *H01M 50/325* (2021.01); *H01M 10/0525* (2013.01); *H01M 2200/20* (2013.01); *H01M 2220/20* (2013.01)

(58) Field of Classification Search
CPC ........... H01M 50/325; H01M 2200/20; H01M 10/345
See application file for complete search history.

(56) References Cited

U.S. PATENT DOCUMENTS

2012/0270083 A1*  10/2012  Kim ..................... H01M 50/367
                                                                    429/87
2014/0220395 A1*  8/2014  Ootsuka ................ H01M 50/15
                                                                    429/56
(Continued)

FOREIGN PATENT DOCUMENTS

CN         107994161 A  *  5/2018
CN         109417142 A     3/2019
(Continued)

OTHER PUBLICATIONS

Communication dated Aug. 2, 2021 from the Indian Intellectual Property Office in Application No. 202014049733.

*Primary Examiner* — Sadie White
*Assistant Examiner* — Kayla Elaine Clary
(74) *Attorney, Agent, or Firm* — Sughrue Mion, PLLC (57) ABSTRACT

A pressure control valve structure includes a wall portion having a plurality of communication holes communicating with their associated internal spaces, a plurality of projections protruding outwardly from a wall surface of the wall portion so as to surround their associated communication holes, a plurality of elastic valve bodies closing their associated communication holes in contact with the projections, an outer peripheral wall portion protruding from the wall surface so as to surround the plurality of projections collectively, and a cover made of a resin and fixed to the outer peripheral wall portion, the cover compressing the elastic valve bodies towards their associated projections. The cover has a thick-walled portion where the cover is made partially thick in an outer surface of the cover.

8 Claims, 9 Drawing Sheets

(56) References Cited

U.S. PATENT DOCUMENTS

| | | | |
|---|---|---|---|
| 2015/0140393 A1* | 5/2015 | Yamamoto | H01M 50/553 |
| | | | 429/121 |
| 2017/0084887 A1* | 3/2017 | Lee | H01M 50/15 |
| 2019/0036087 A1* | 1/2019 | Osasa | H01M 10/4221 |
| 2019/0334145 A1 | 10/2019 | Omura et al. | |
| 2020/0227772 A1* | 7/2020 | Inoue | H01G 11/78 |

FOREIGN PATENT DOCUMENTS

| | | | | |
|---|---|---|---|---|
| JP | 2015-125799 A | 7/2015 | | |
| JP | 2019-061850 A | 4/2019 | | |
| JP | 2019-185925 A | 10/2019 | | |
| WO | WO-2019065000 A1 * | 4/2019 | | H01G 11/10 |

* cited by examiner

PRESSURE CONTROL VALVE STRUCTURE AND POWER STORAGE MODULE

CROSS-REFERENCE TO RELATED APPLICATION

This application claims priority to Japanese Patent Application No. 2019-213039 filed on Nov. 26, 2019, the entire disclosure of which is incorporated herein by reference.

The present disclosure relates to a pressure control valve structure and a power storage module.

BACKGROUND ART

A power storage module disclosed in Japanese Patent Application Publication No. 2019-61850 has been known. This power storage module is provided with a pressure control valve for adjusting the pressure in an internal space (internal pressure) of the power storage module. The internal pressure may be increased by generation of gas in the internal space. The pressure control valve includes an elastic valve body for closing an opening (communication hole) communicating with the internal space. The elastic valve body is accommodated in a case where one end of the opening is formed with the elastic valve body pressed by a cover member (cover) fixed to the case. The elastic valve body pressed by the cover member closes the one end of opening in an elastically deformed state. When the internal pressure increases, the elastic valve body may deform due to pressure of gas from the opening, and gas may be discharged from the inside through the opening.

In a case where a plurality of elastic valve bodies are simultaneously pressed by the cover, the valve opening pressures of the elastic valve bodies may be made uniform by making forces applied from the cover to the elastic valve bodies uniform. However, in a case where the cover is formed by, for example, injection molding, pressing forces to the elastic valve bodies may not be uniform due to warping of the cover formed during molding, which may result in varied valve opening pressures of the valve bodies.

The present disclosure is directed to providing a pressure control valve structure and a power storage module capable of suppressing warping of a cover.

SUMMARY

In accordance with an aspect of the present disclosure, there is provided a pressure control valve structure used for a power storage module having a plurality of internal spaces includes a wall portion having a plurality of communication holes communicating with their associated internal spaces, a plurality of projections protruding outwardly from a wall surface of the wall portion so as to surround their associated communication holes, a plurality of elastic valve bodies, each of the elastic valve bodies having a first end surface and a second end surface opposite from the first end surface, and closing their associated communication holes with the first end surface of each of the elastic valve bodies placed in contact with the projections, an outer peripheral wall portion protruding from the wall surface so as to surround the plurality of projections collectively, and a cover made of a resin and fixed to the outer peripheral wall portion, the cover having a flat inner surface that presses the second end surface so as to compress the elastic valve bodies towards their associated projections. The cover has a thick-walled portion where the cover is made partially thick. The thick-walled portion is formed protruding outwardly from an outer surface of the cover opposite from the inner surface so that a distance from the inner surface to a protruded end of the thick-walled portion is greater than a distance from the inner surface to the outer surface in a thickness direction of the cover.

In accordance with another aspect of the present disclosure, there is provided a power storage module including the pressure control valve structure.

Other aspects and advantages of the present disclosure will become apparent from the following description, taken in conjunction with the accompanying drawings, illustrating by way of example the principles of the present disclosure.

BRIEF DESCRIPTION OF DRAWINGS

The present disclosure together with objects and advantages thereof may best be understood by reference to the following description of the presently to preferred embodiments together with the accompanying drawings in which.

DESCRIPTION OF EMBODIMENTS

The following will describe an embodiment of the present disclosure in detail with reference to the accompanying drawings. In the description of the drawings, the same reference numerals are used for the same or equivalent parts, and the repeated descriptions are omitted. In the drawings, an XYZ Cartesian coordinate system may be shown as required.

Figure 1:
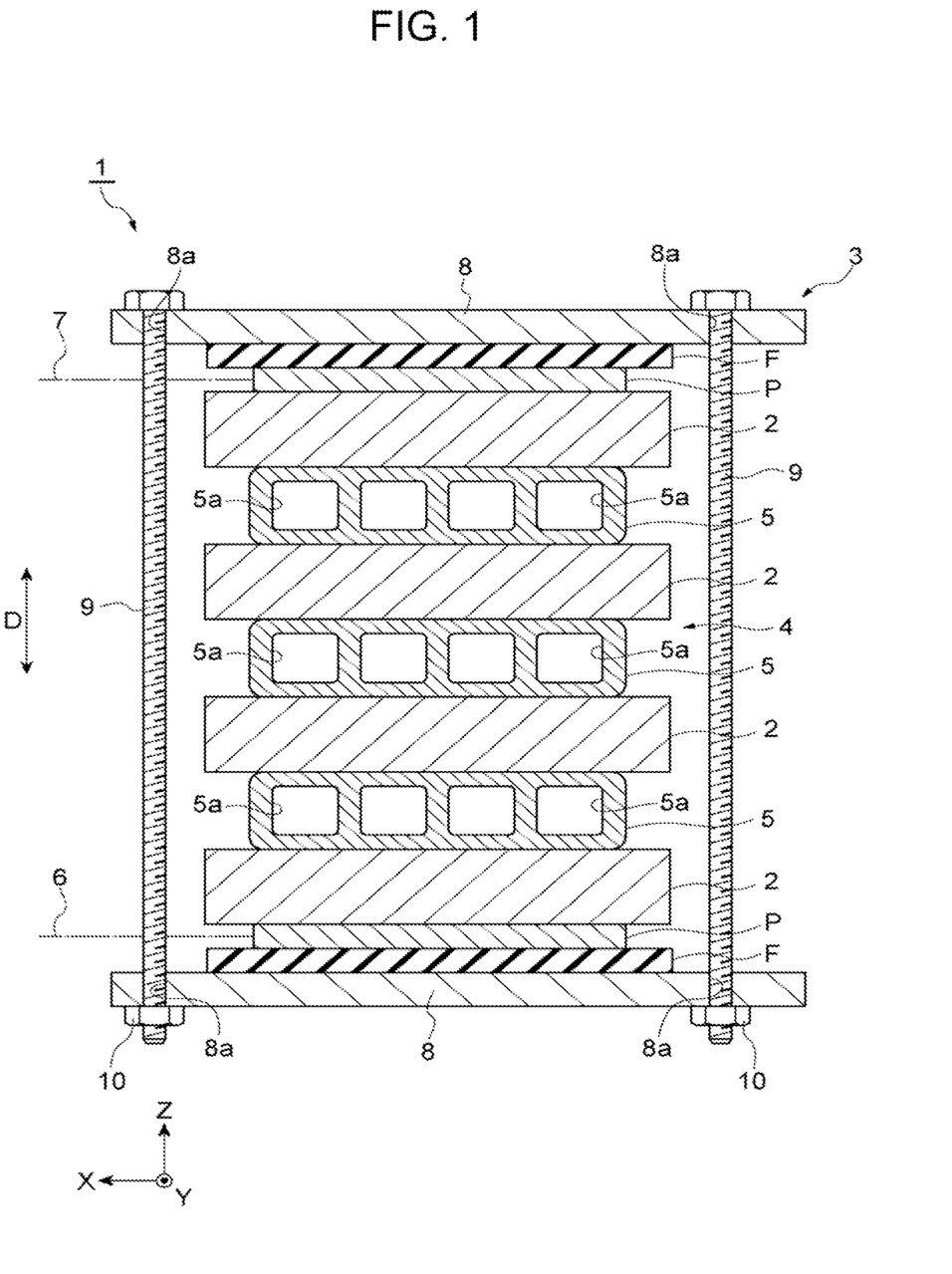
FIG. 1 is a schematic cross-sectional view illustrating a power storage device provided with an example of a power storage module.

FIG. 1 is a schematic cross-sectional view illustrating an example of a power storage device including a power storage module according to the present embodiment. A power storage device 1 illustrated in FIG. 1 is used as a battery for various vehicles such as a forklift truck, a hybrid vehicle, and an electric vehicle. The power storage device 1 includes a module stack 4 in which a plurality of power storage modules 2 are stacked, and a constraining member 3 that applies a constraint load to the module stack 4 in a stacking direction D of the module stack 4.

The module stack 4 includes the plurality of power storage modules 2 (four power storage modules 2 illustrated in the drawing), and a plurality of conductive plates 5 (three conductive plates 5 illustrated in the drawing). The power storage modules 2 each are a bipolar battery, and have a rectangular shape as viewed from the stacking direction D The power storage modules 2 each are, for example, a secondary battery such as a nickel-hydrogen secondary battery and a lithium ion secondary battery, or an electric double layer capacitor. In the following description, a nickel-hydrogen secondary battery will be described as an example.

Adjacent two of the power storage modules 2 in the stacking direction D are electrically connected in series through one of the conductive plates 5. Conductive plates P electrically connected to the power storage modules 2 and insulating plates F are stacked in this order on the both ends of the module stack 4 in the stacking direction D. A positive terminal 6 is connected to one of the conductive plates P, and a negative terminal 7 is connected to the other of the conductive plates P. The positive terminal 6 and the negative terminal 7 are drawn out, for example, from the edge portions of the conductive plates P in a direction intersecting the stacking direction D. Charging and discharging of the power storage device 1 is performed through the positive terminal 6 and the negative terminal 7.

The conductive plate 5 disposed between the power storage modules 2 has therein a plurality flow paths 5a through which cooling medium such as air is circulated. The flow paths 5a extend, for example, along the stacking direction D and a drawing direction in which the positive terminal 6 and the negative terminal 7 are drawn, the stacking direction D and the drawn direction intersecting with each other (perpendicular to each other). The conductive plate 5 serves as a in connecting member that electrically connects the power storage modules 2 to each other. Further, the conductive plate 5 also serves as a heat sink that dissipates heat generated in the power storage module 2 with the cooling medium circulated through these flow paths 5a. Although the area of the conductive plate 5 is smaller than the area of the power storage module 2 as viewed from the stacking direction D in an example illustrated in FIG. 1, the area of the conductive plate 5 may be the same as the area of the power storage module 2, or may be larger than the area of the power storage module 2 for improving the heat dissipation performance.

The constraining member 3 includes a pair of end plates 8 between which the module stack 4 is sandwiched in the stacking direction D, fastening bolts 9 and nuts 10 that fasten the end plates 8 to each other. The end plate 8 is a rectangular metal plate having an area greater than the areas of the power storage module 2, the conductive plate 5, and the conductive plate P as viewed from the stacking direction D. The insulating plate F having an electrically insulating property is provided between the end plate 8 and the conductive plate P, so that the end plate 8 and the conductive plate P are insulated by the insulating plate F.

Insertion holes 8a are formed in the edge portions of each of the end plates 8 at positions outward of the module stack 4 as viewed from the stacking direction D. The fastening bolt 9 is inserted from the insertion hole 8a of one of the end plates 8 towards the insertion hole 8a of the other of the end plates 8. The nut 10 is screwed into a tip of the fastening bolt 9 protruding out from the insertion hole 8a of the other end plate 8. In this way, the power storage module 2, the conductive plate 5, and the conductive plate P is held between the end plates 8, which forms a unit corresponding to the module stack 4. Further, constraint load is applied to the module stack 4 in the stacking direction D.

Figure 2:
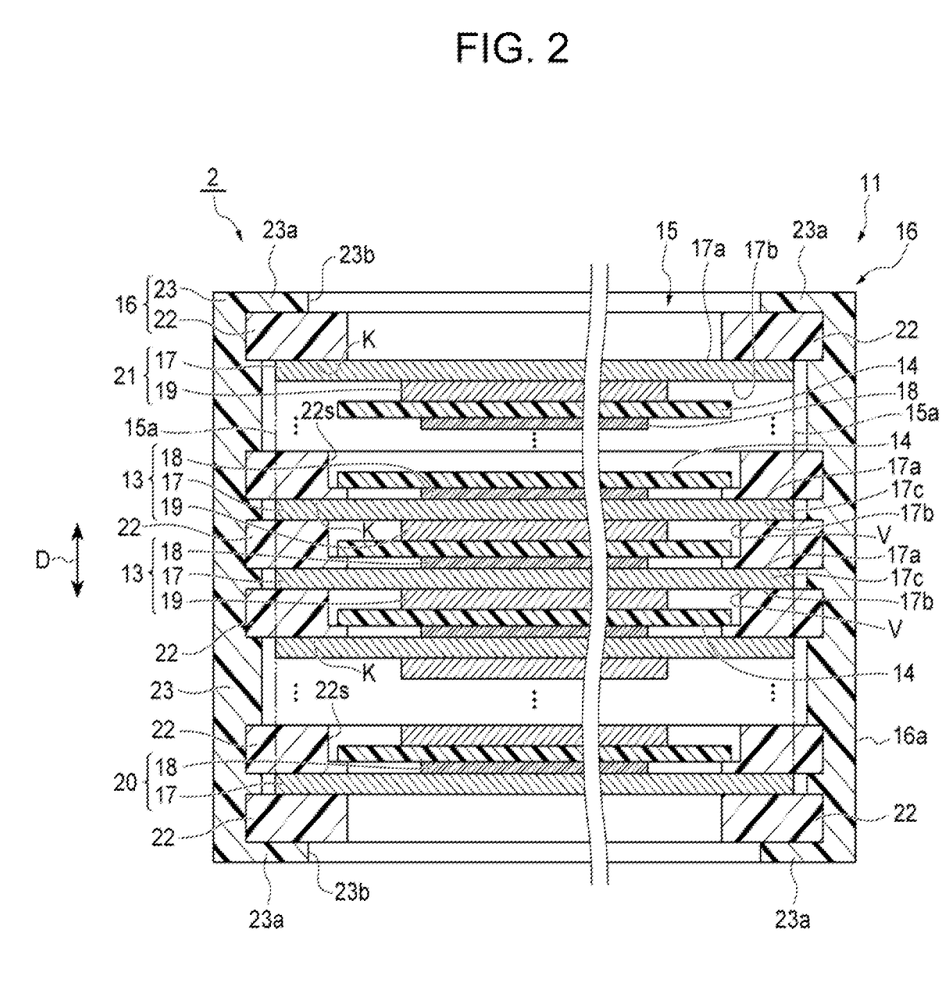
FIG. 2 is a schematic cross-sectional view illustrating the example of the power storage module.
Figure 3:
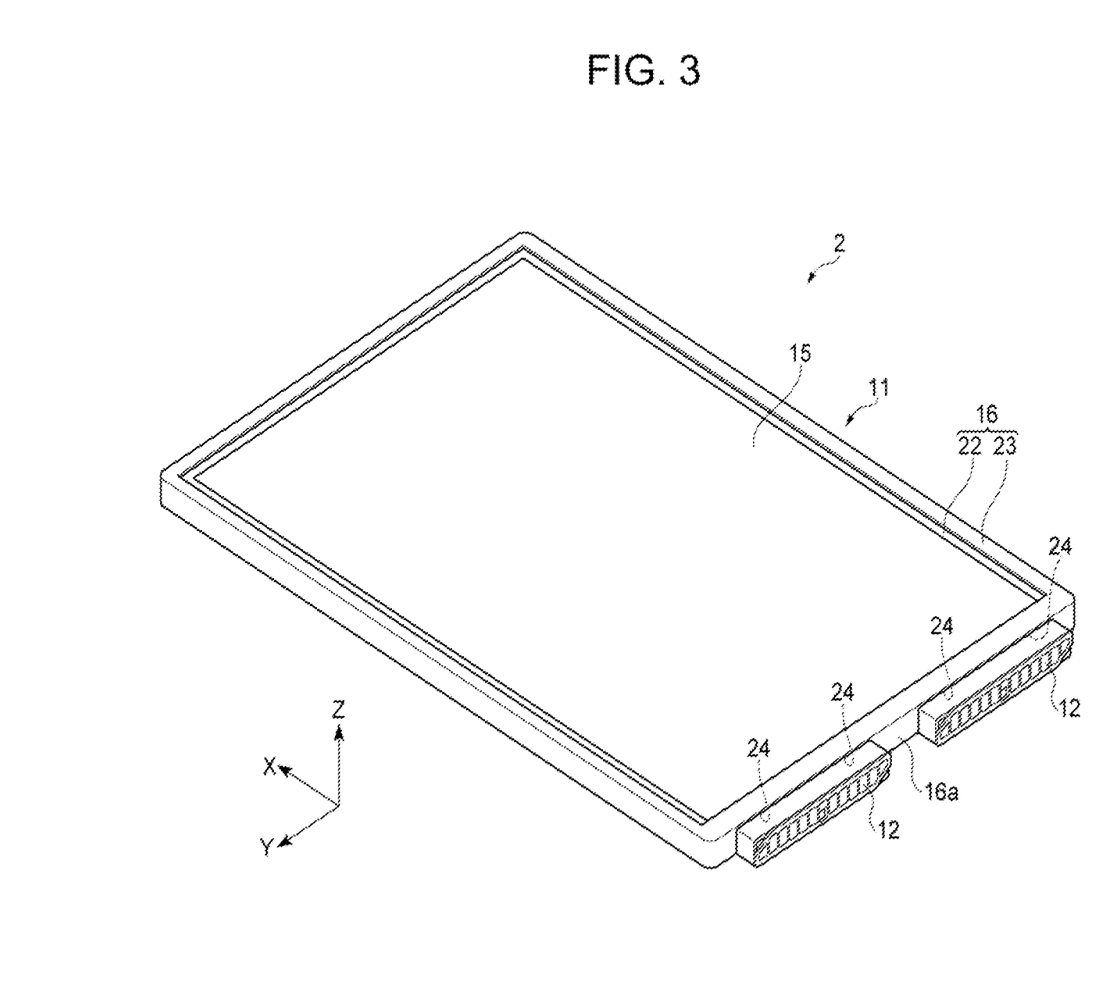
FIG. 3 is a schematic perspective view illustrating the example of the power storage module.

Next, the configuration of the power storage module 2 will be described in detail. FIG. 2 is a schematic cross-sectional view illustrating an internal configuration of the power storage module. FIG. 3 is a schematic perspective view of the power storage module. In FIGS. 2 and 3, the power storage module 2 has a structure (multiple cell structure) in which a plurality of cells (e.g., twenty four cells) are stacked in the stacking direction D. It is noted that a "cell" corresponds to a minimum unit constituting a battery, and has an internal space in which a positive electrode, a negative electrode, a separator, and an electrolyte are disposed. Although one cell includes one positive electrode, one negative electrode, a separator disposed between the positive electrode and the negative electrode, and an electrolyte that are accommodated in the internal space in one example, one cell may include, for example, a plurality of positive electrodes, a plurality of negative electrodes, a plurality of separators, and an electrolyte that are accommodated in the internal space.

The power storage module 2 includes a module main body 11 and a plurality of pressure control valves 12 (four pressure control valves 12 in the present embodiment) mounted to the module main body 11. The module main body 11 includes an electrode stack 15 and a frame 16 that is disposed so as to surround the electrode stack 15. The electrode stack 15 includes a plurality of electrodes stacked with separators 14 disposed therebetween along the stacking direction D of the power storage module 2. The plurality of electrodes includes a plurality of bipolar electrodes 13, a negative terminal electrode 21, and a positive terminal electrode 20.

The bipolar electrode 13 includes an electrode plate 17 having one surface 17a and the other surface 17b on the opposite side of the electrode plate 17 from the one surface 17a, a positive electrode active material layer 18 provided on the one surface 17a, and a negative electrode active material layer 19 provided on the other surface 17b. The electrode plate 17 is coated with a positive electrode slurry containing a positive electrode active material to form the positive electrode active material layer 18. For example, nickel hydroxide is used as the positive electrode active material. The electrode plate 17 is coated with a negative electrode slurry containing a negative electrode active material to form the to negative electrode active material layer 19. For example, hydrogen storage alloy is used as the negative electrode active material.

In the present embodiment, a region where the negative electrode active material layer 19 is formed on the other surface 17b of the electrode plate 17 is greater than a region where the positive electrode active material layer 18 is formed on the one surface 17a of the electrode plate 17. In the electrode stack 15, the positive electrode active material layer 18 of one bipolar electrode 13 faces the negative electrode active material layer 19 of another bipolar electrode 13 that is disposed adjacently to the one bipolar electrode 13 on one side thereof in the stacking direction D with the separator 14 disposed therebetween. In the electrode stack 15, the negative electrode active material layer 19 of one bipolar electrode 13 faces the positive electrode active material layer 18 of another of the bipolar electrodes 13 that is disposed adjacent to the one bipolar electrode 13 on the other side thereof in the stacking direction D with the separator 14 interposed therebetween.

The negative terminal electrode 21 includes the electrode plate 17 and the negative electrode active material layer 19 provided on the other surface 17b of the electrode plate 17. The negative terminal electrode 21 is disposed at one end of the electrode stack 15 in the stacking direction D so that the other surface 17b faces the center of the electrode stack 15 in the stacking direction D. The one surface 17a of the electrode plate 17 of the negative terminal electrode 21 forms an outer surface of the electrode stack 15 on one side in the stacking direction D, and is electrically connected to the conductive plate 5 or the conductive plate P (FIG. 1) that is disposed adjacently to the power storage module 2 on the one side. The negative electrode active material layer 19 formed on the other surface 17b of the electrode plate 17 of the negative terminal electrode 21 faces the positive electrode active material layer 18 of the bipolar electrode 13 disposed at the one end of the electrode stack 15 in the stacking direction D with the separator 14 disposed therebetween.

The positive terminal electrode 20 includes the electrode plate 17 and the positive electrode active material layer 18 formed on the one surface 17a of the electrode plate 17. The positive terminal electrode 20 is disposed at the other end of the electrode stack 15 in the stacking direction D so that the one surface 17a faces the center of the electrode stack 15 in the stacking direction D. The other surface 17b of the electrode plate 17 of the positive terminal electrode 20 forms an outer surface of the electrode stack 15 on the other side in the stacking direction D, and is electrically connected to the conductive plate 5 or the conductive plate P (FIG. 1) that is disposed adjacently to the other end of the power storage module 2 on the other side. The positive electrode active material layer 18 formed on the one surface 17a of the positive terminal electrode 20 faces the negative electrode active material layer 19 of the bipolar electrode 13 disposed at the other end of the electrode stack 15 in the stacking direction D with the separator 14 disposed therebetween.

The electrode plate 17 is a conductor having a plate shape extending in the horizontal direction, and has flexibility. Thus, the horizontal direction corresponds to the extending direction of the electrode plate 17. The electrode plate 17 is provided by, for example, a nickel foil, a plated steel plate, or a plated stainless steel plate. An example of the steel plate is a cold reduced carbon steel sheet (SPCC, or the like) as defined in JIS G 3141:2005. An example of the stainless steel plate is a SUS304, or the like, as defined in JIS G 4305:2015. The thickness of the electrode plate 17 is, for example, 0.1 µm to 1000 µm or less. When the electrode plate 17 is provided by a nickel foil, the nickel foil may be plated. The electrode plate 17 has an edge portion 17c (the edge portion of the bipolar electrode 13) that has a rectangular frame shape, and the edge portion 17c is a part which is not coated with the positive electrode slurry or the negative electrode slurry.

The separator 14 has, for example, a sheet shape. For example, a porous film made of a polyolefin-based resin such as polyethylene (PE) and polypropylene (PP), a woven fabric or a nonwoven fabric made of polypropylene, methylcellulose, or the like, and the like may be used for the separator 14. The separator 14 may be reinforced with a vinylidene fluoride resin compound.

The frame 16 is made of, for example, an insulating resin, and has a rectangular tubular shape as a whole. The frame 16 is disposed so as to surround the edge portions 17c of the electrode plates 17 and also to surround the side surface 15a of the electrode stack 15. The frame 16 holds the edge portions 17c. The frame 16 includes a plurality of first sealing portions 22 connected to the edge portions 17c of the electrode plates 17, and a second sealing portion 23 extending along the stacking direction D and joined to each of the first sealing portions 22. The first sealing portion 22 and the second sealing portion 23 are made of insulating resin having alkali resistance. As a material for the first sealing portion 22 and the second sealing portion 23, for example, polypropylene (PP), polyphenylene sulfide (PPS), modified polyphenylene ether (modified PPE), and the like may be used.

The first sealing portion 22 is provided continuously over the entire circumference of the edge portion 17c on the one surface 17a of the electrode plate 17, and has a rectangular frame shape as viewed from the stacking direction D. In the present embodiment, the first sealing portion 22 is provided not only for the electrode plate 17 of the bipolar electrode 13, but also for the electrode plate 17 of the negative terminal electrode 21 and the electrode plate 17 of the positive terminal electrode 20. In the negative terminal electrode 21, the first sealing portion 22 is provided on the edge portion 17c of the one surface 17a of the electrode plate 17, and in the positive terminal electrode 20, the first sealing portion 22 is provided on the edge portion 17c of each of the one surface 17a and the other surface 17b of the electrode plate 17.

The first sealing portion 22 is disposed so as to overlap the edge portion 17c of the electrode plate 17 to form an overlapping portion K. The first sealing portion 22 is welded hermetically to the electrode plate 17 at the overlapping portion K, for example, by ultrasonic or thermocompression. The first sealing portion 22 is formed by using, for example, a film having a predetermined thickness in the stacking direction D. The inner part of the first sealing portion 22 is positioned between the edge portions 17c of the electrode plates 17 adjacent to each other in the stacking direction D (inward of the side surface 15a of the electrode stack 15). The outer part of the first sealing portion 22 extends outward of the edge of the electrode plate 17 (outward of the side surface 15a of the electrode stack 15) and such a portion extending outward is held by the second sealing portion 23. The first sealing portions 22 adjacent to each other along the stacking direction D may be spaced apart from each other or in contact with each other. The outer edge portions of the first sealing portions 22 may be joined to each other, for example, by heat plate welding.

In the electrode stack 15, a stepped portion 22s for placing an edge portion of the separator 14 is provided on the inner edge side of the first sealing portion 22 located in inner layers in the stacking direction D. The stepped portion 22s may be formed by folding the outer edge portion of the film forming the first sealing portion 22 inwardly. The stepped portion 22s may be formed by overlapping a film forming an upper layer with a film forming a lower layer.

The second sealing portion 23 is disposed outwards of the electrode stack 15 and the first sealing portion 22, and forms an outer wall of the power storage module 2 (housing). The second sealing portion 23 is formed, for example, by injection molding of resin, and extends over the entire length of the electrode stack 15 along the stacking direction D. The second sealing portion 23 has a rectangular frame shape extending in the stacking direction D as its axial direction. The second sealing portion 23 is welded to the outer edge portion of the first sealing portions 22, for example, by heat generated at the injection molding.

The second sealing portion 23 has overhang portions 23a on opposite ends thereof in the stacking direction D. One of the overhang portions 23a extends towards the inner edge portion of the first sealing portion 22 at the one end of second sealing portion 23 in the stacking direction D, and is fixed to the first sealing portion 22 that is welded to the one surface 17a of the electrode plate 17 forming the negative terminal electrode 21. The other of the overhang portions 23a extends towards the inner edge portion of the first sealing portion 22 at the other end of second sealing portion 23 in the stacking direction D, and is fixed to the first sealing portion 22 that is welded to the other surface 17b of the electrode plate 17 forming the positive terminal electrode 20. The overhang lengths of the overhang portions 23a are equal to each other, and the ends 23b of these overhang portions 23a are positioned so as to overlap the overlapping portion K where the electrode plate 17 and the first sealing portion 22 overlap as viewed from the stacking direction D.

The first sealing portions 22 and the second sealing portion 23 cooperate to form internal spaces V between the adjacently disposed electrodes and to seal the internal spaces V. More specifically, the second sealing portion 23 and the first sealing portions 22 cooperate to seal between the bipolar electrodes 13 disposed adjacently to each other along the stacking direction D, between the negative terminal electrode 21 and the bipolar electrode 13 disposed adjacently to each other along the stacking direction D, and between the positive terminal electrode 20 and the bipolar electrode 13 disposed adjacently to each other along the stacking direction D, respectively. Thus, the internal spaces V are formed between the bipolar electrodes 13 disposed adjacently to each other, between the negative terminal electrode 21 and the bipolar electrode 13 disposed adjacently to each other, and between the positive terminal electrode 20 and the bipolar electrode 13 disposed adjacently to each other. The internal spaces V are hermetically partitioned. In the present embodiment, the internal space V corresponds to a space surrounded by the one surface 17a of the one electrode plate 17, the other surface 17b of another electrode plate 17 disposed adjacently to the one electrode plate 17, and the first sealing portion 22. The internal space V is filled with the electrolyte. The electrolyte is an aqueous electrolyte containing an alkaline solution such as aqueous potassium hydroxide solution. The separator 14, the positive electrode active material layer 18, and the negative electrode active material layer 19 are impregnated with the electrolyte. The to power storage module 2 includes a plurality of internal spaces V arranged in order in the stacking direction D (twenty four internal spaces V in the illustrated example).

Figure 4:
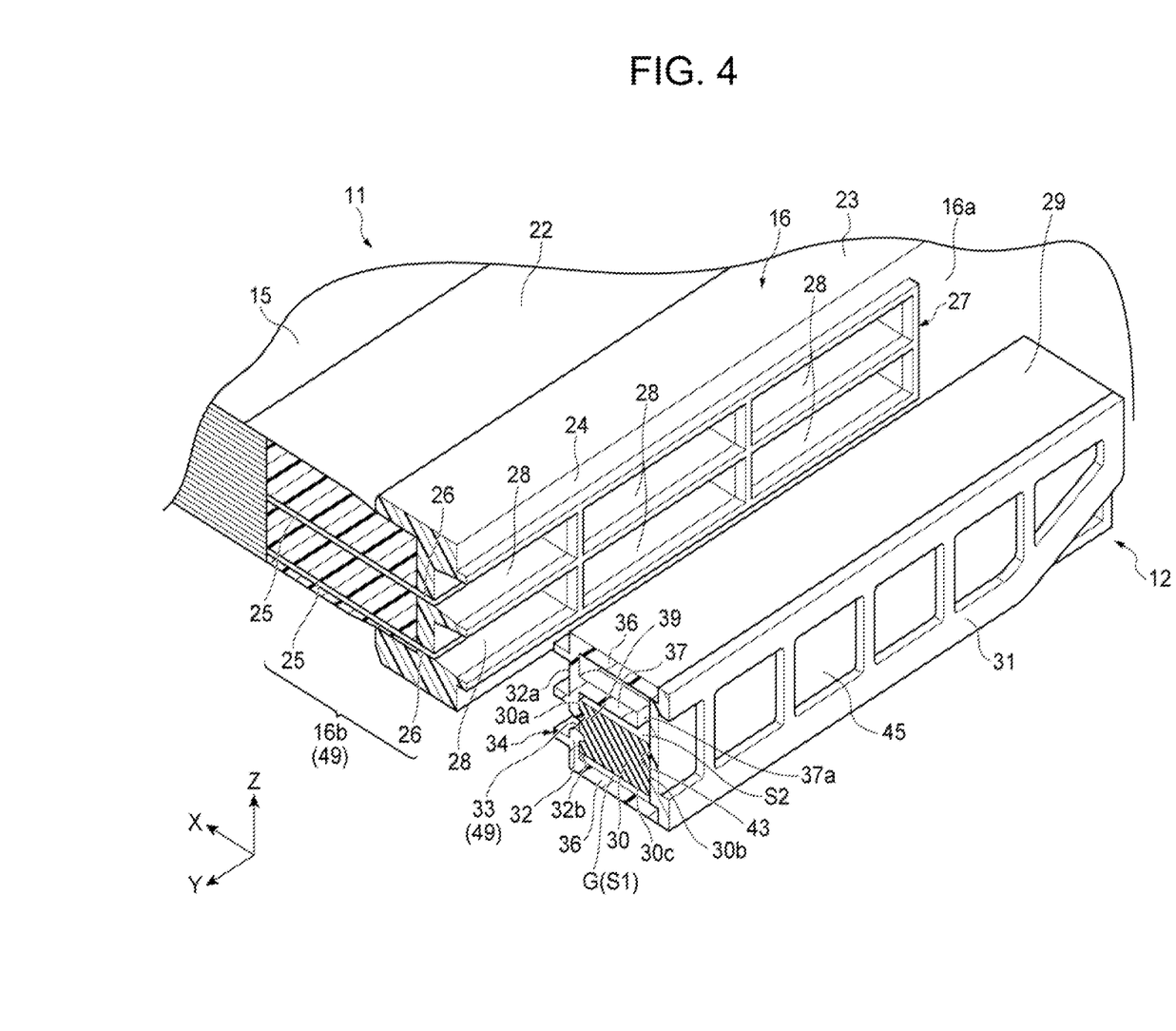
FIG. 4 is an exploded perspective view illustrating a part of the example of the power storage module.
Figure 5:
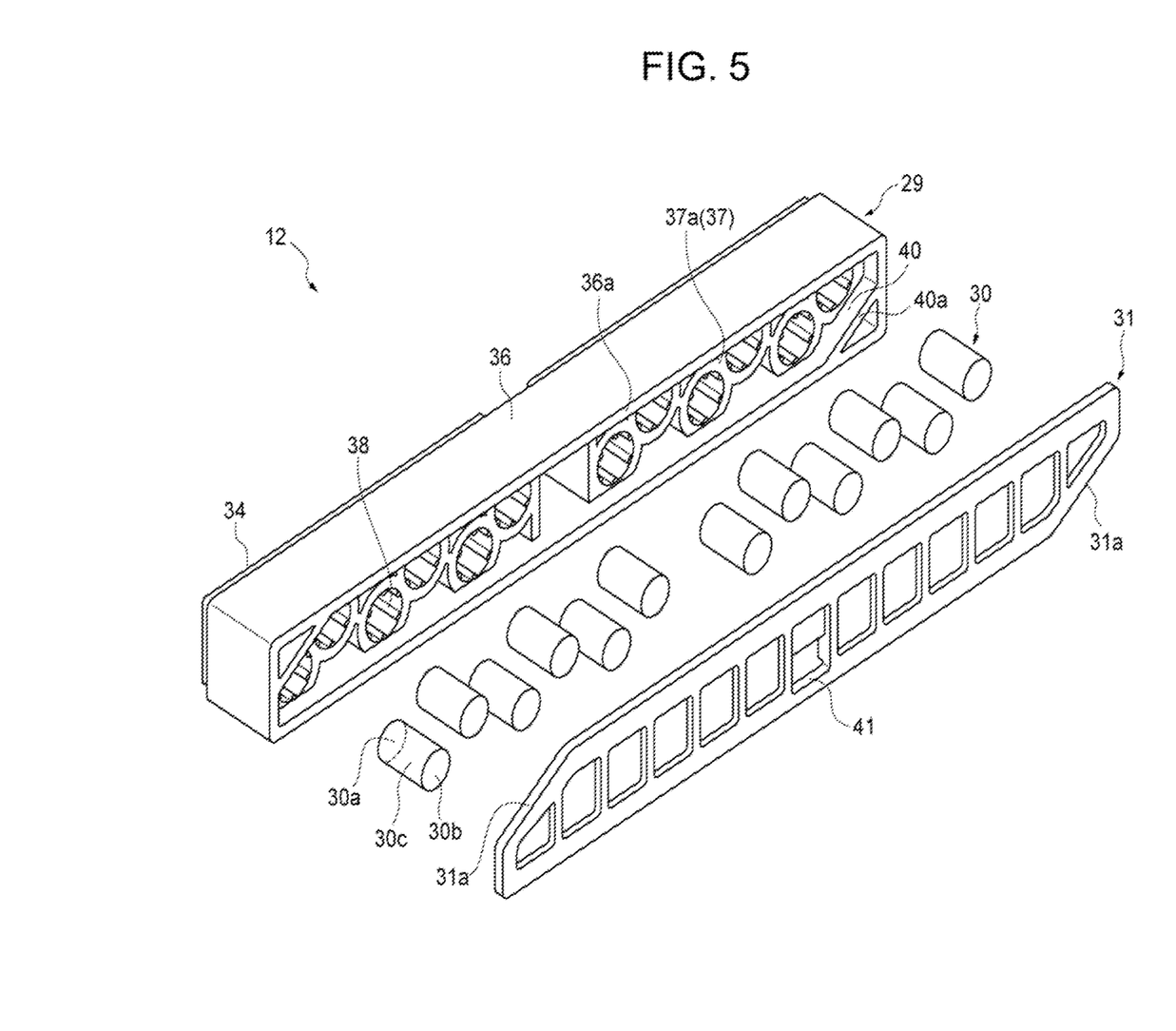
FIG. 5 is an exploded perspective view illustrating an example of a pressure control valve.
Figure 6:
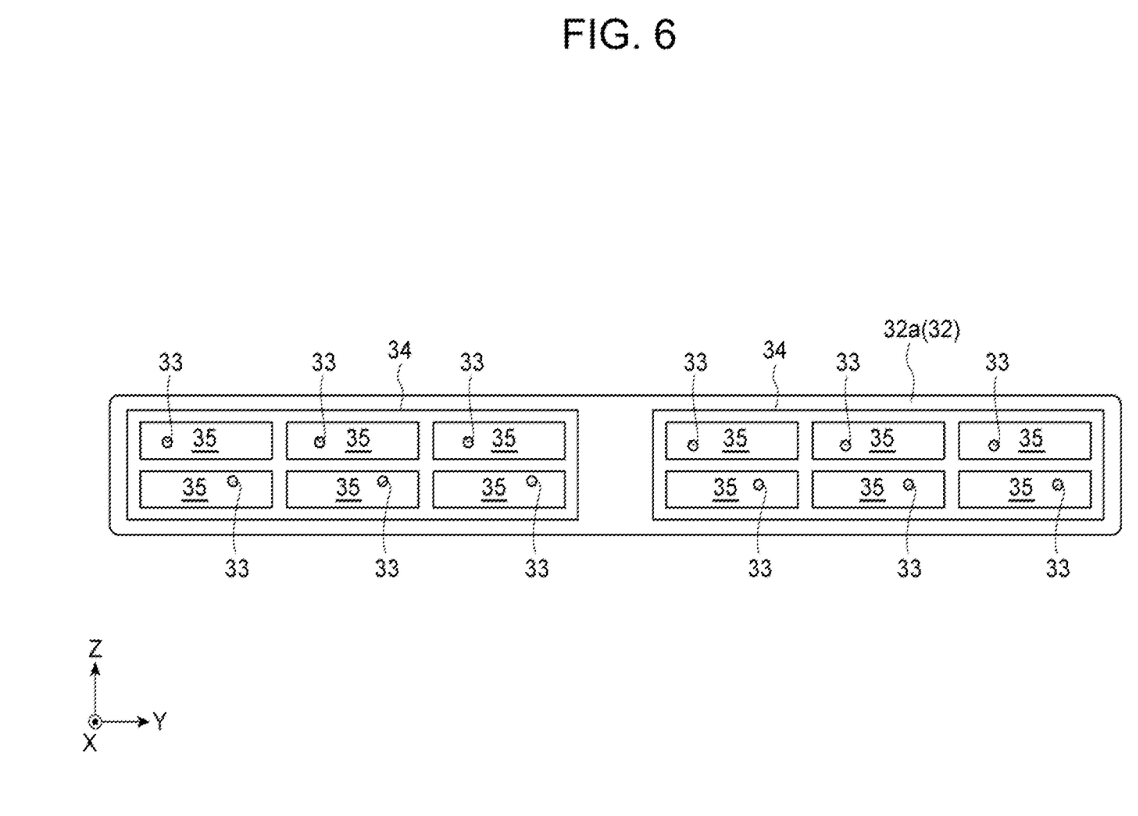
FIG. 6 is a bottom view of the example of the pressure control valve.
Figure 7:
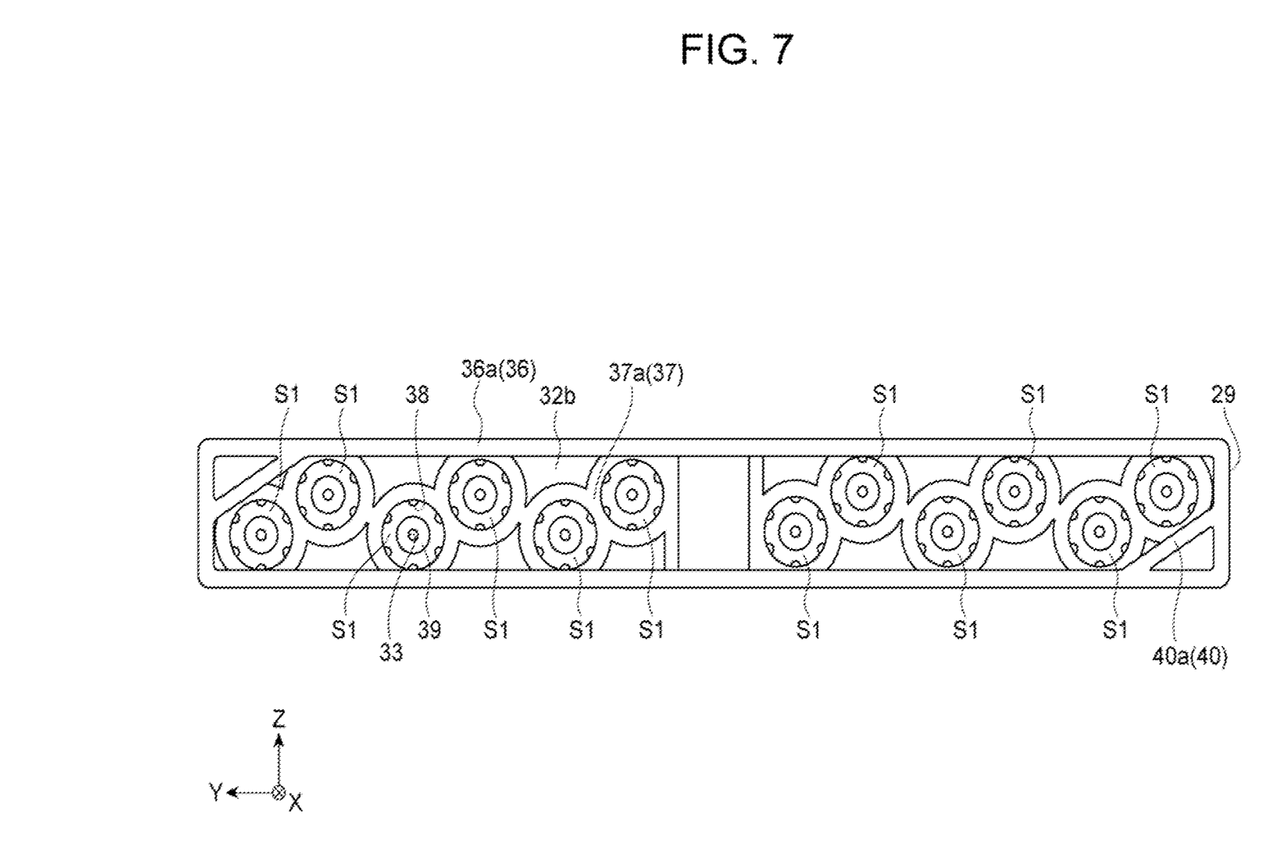
FIG. 7 is a plan view illustrating an example of a case.
Figure 8:
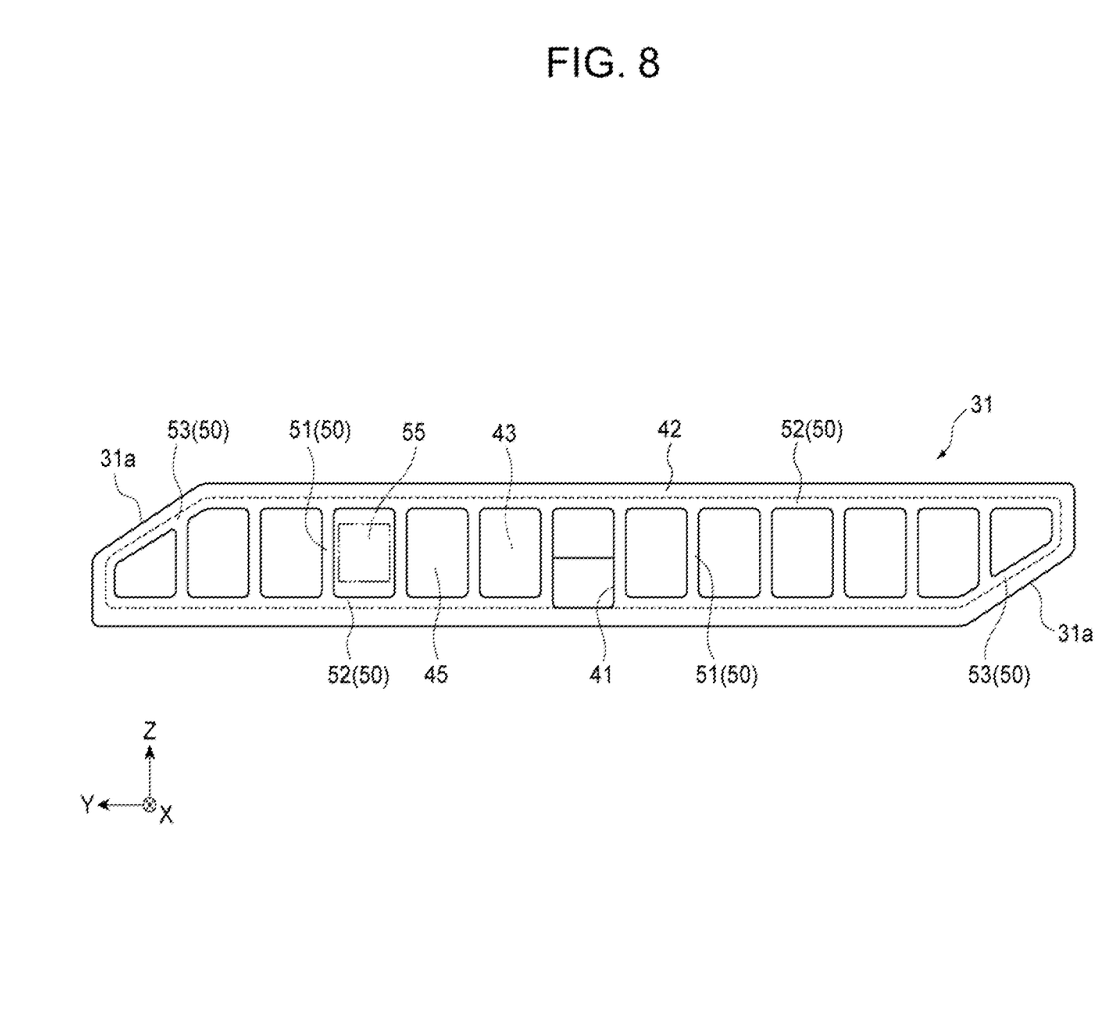
FIG. 8 is a plan view illustrating an example of a cover.
Figure 9:
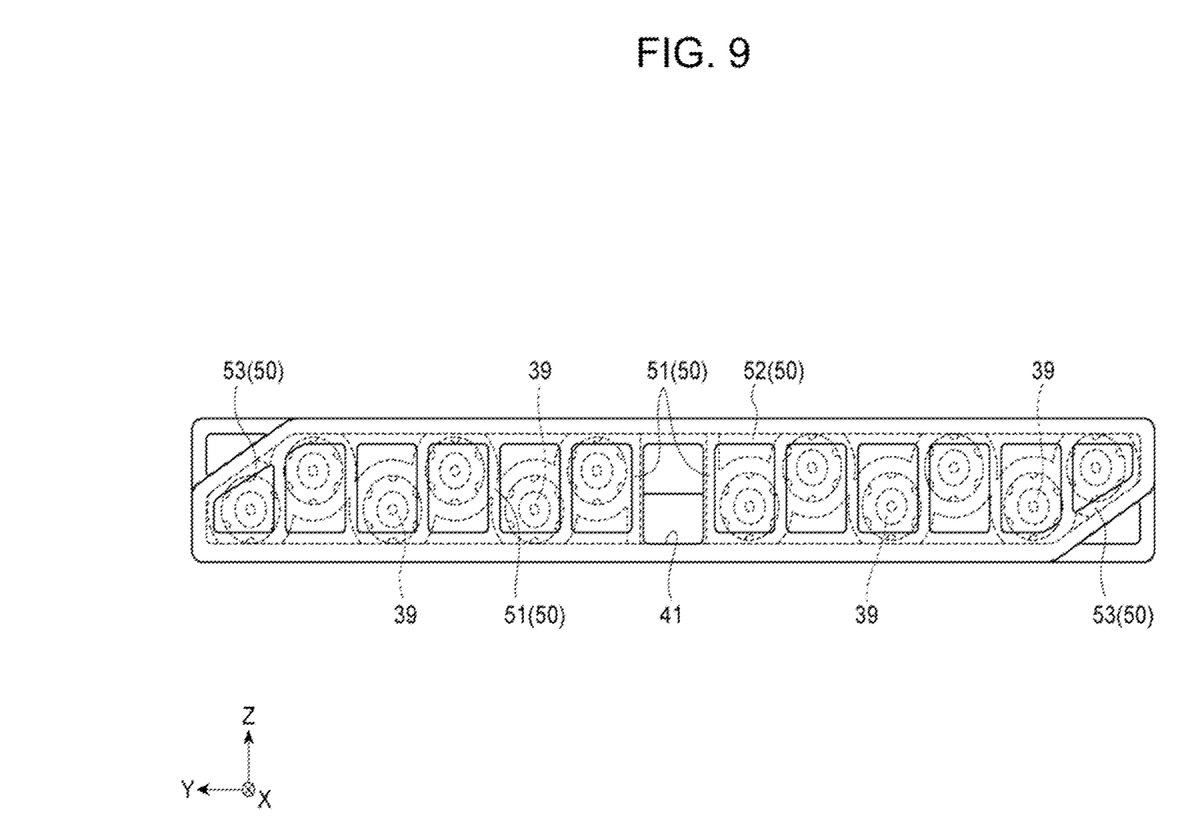
FIG. 9 is a plan view illustrating a state where the case and the cover are assembled.

Referring further to FIGS. 4 to 9, the configuration of the pressure control valve 12, which corresponds to the pressure control valve structure of the present disclosure, will be described in detail. FIG. 4 is an exploded perspective view illustrating a part of the power storage module of one example. FIG. 5 is an exploded perspective view illustrating a pressure control valve of one example. FIG. 6 is a bottom view of the pressure control valve of one example. FIG. 7 is a plan view of a case forming the pressure control valve. FIG. 8 is a plan view of a cover forming the pressure control valve FIG. 9 is a plan view illustrating a state where the case and the cover are assembled.

As illustrated in FIGS. 3 and 4, a plurality of mounting areas 24 (four mounting areas in the present embodiment) for mounting the pressure control valve 12 are provided in one wall portion 16a forming the frame 16. In one example, one pressure control valve 12 is provided for two mounting areas 24 disposed side by side in the Y direction. The frame 16 has through holes 16b formed in the mounting areas 24 of the frame 16, extending through to the internal spaces V (FIG. 2). Each mounting area 24 is provided with a plurality of through holes 16b (six through holes in the present embodiment). The through holes 16b are arranged in two rows so that each row has three through holes 16b (three through holes in the Y direction, two through holes in the Z direction) in each mounting area 24. Thus, the through holes 16b are arranged in two rows so that each row has twelve through holes 16b in the wall portion 16a. The through holes 16b communicate with their associated internal spaces V of the different cells.

Each of the through holes 16b includes a through hole 25 provided in the first sealing portion 22 and a through hole 26 provided in the second sealing portion 23. The through hole 16b functions as an inlet hole through which the electrolyte is injected into the internal space V. After the electrolyte is injected, the through hole 16b serves as a flow path through which gas (e.g., hydrogen gas) generated in the internal space V flows.

A connecting projection 27 having a substantially frame shape is formed in the outer surface of each mounting area 24 of the second sealing portion 23. The connecting projection 27 connects the module main body 11 to the pressure control valve 12, and the connecting projection 27 and the through hole 26 cooperate to form a plurality of flow paths 28 (six flow paths 28 illustrated in the drawing) through which gas from the internal spaces V flows. Thus, the flow paths 28 are arranged in two rows so that each row includes three flow paths 28 in each mounting area 24. The flow paths 28 each have a rectangular shape in a cross section along a plane perpendicular to the X direction. The connecting projection 27 has a lattice shape as viewed from the X direction.

As illustrated in FIGS. 4 and 5, the pressure control valve 12 includes a case 29, a plurality of valve bodies 30 (twelve valve bodies 30 illustrated in the drawing), and a cover 31. The case 29 is made of a resin such as PP, PPS or modified PPE. The case 29 has a generally rectangular shape as viewed from the facing direction in which the case 29 faces the cover 31. The facing direction corresponds to a mounting direction in which the pressure control valve 12 is mounted to the module main body 11 (the wall portion 16a), and also to a compressing direction of the valve body 30, which will be described later. The pressure control valve 12 is mounted to the module main body 11 in a direction perpendicular to the wall portion 16a. Thus, the facing direction coincides with the X direction.

The case 29 has a bottom wall portion 32. The bottom wall portion 32 has a plurality of through holes 33 (twelve through holes 33 illustrated in the drawing), which extends from an outer wall surface 32a of the bottom wall portion 32 on the module main body 11 side to an inner wall surface 32b (wall surface) of the bottom wall portion 32 on the cover 31 side in the facing direction. These through holes 33 are connected to their associated through holes 16b of the module main body 11 through a space. Thus, the through holes 33 and the through holes 16b cooperate to form a plurality of communication holes 49 each communicating with each of a plurality of the internal spaces V formed in the module main body 11, In other words, the through holes 33 and the through holes 16b form a portion of the communication hole 49. The through hole 33 corresponds to an outlet of the communication hole 49, and has a circular shape in cross section (see FIG. 6) along a plane extending perpendicular to the X direction (Y-Z plane).

As illustrated in FIG. 6, paired connecting projections 34 having a substantially frame shape are formed in the outer wall surface 32a of the bottom wall portion 32. The paired connecting projections 34 are spaced at an interval in the direction Y, which corresponds to the interval between the connecting projections 27. The paired connecting projections 34 connect the module main body 11 to the pressure control valve 12, and forms a plurality of flow paths 35 (twelve flow paths 35 illustrated in the drawing) through which gas from the internal spaces V flows. The connecting projections 34 are connected to the connecting projections 27 of the module main body 11. The connecting projections 34 each have a shape and dimensions corresponding to each of the connecting projections 27. Thus, the flow paths 35 each have a rectangular shape in cross section along the plane extending perpendicular to the X direction (Y-Z plane). Further, the connecting projections 34 each have a lattice shape as viewed from the X direction. The module main body 11 and the pressure control valve 12 are connected, for example, by hot plate welding. Specifically, a heated plate is placed between the module main body 11 and the pressure control valve 12 and then the ends of the connecting projections 27 and the connecting projections 34 are brought into contact with the heated plate, so that the ends of the connecting projections 27 and the connecting projections 34 are melted. Subsequently, the ends of the connecting projections 34 are pressed against the ends of the connecting projections 27 while the connecting projections 27 and the connecting projections 34 are melted, so that the connecting projections 27 and 34 are welded (connected). As a result, the module main body 11 and the pressure control valve 12 are connected.

As illustrated in FIGS. 4, 5 and 7, the case 29 has an outer peripheral wall portion 36 and partition wall portions 37, both protruding from the bottom wall portion 32 towards the cover 31. In the present embodiment, the outer peripheral wall portion 36 and the partition wall portions 37 are formed integrally with the bottom wall portion 32. The outer peripheral wall portion 36 is formed standing from the edge portion of the inner wall surface 32b of the bottom wall portion 32 so that the outer peripheral wall portion 36 surrounds the plurality of valve bodies 30 (twelve valve bodies 30 illustrated in the drawing) collectively. Specifically, the outer peripheral wall portion 36 is formed extending over the entire periphery of the outer peripheral edge portion of the bottom wall portion 32 and forms the outer wall of the case 29. More specifically, the outer peripheral wall portion 36 is formed in a substantially rectangular frame shape extending along the outer peripheral edge portion of the bottom wall portion 32 having a substantially rectangular frame shale as viewed from the facing direction.

The partition wall portions 37 each are formed standing from the inner wall surface 32b of the bottom wall portion 32 so as to cover a side surface 30c of each valve body 30. In one example, the partition wall portions 37 each form an accommodation space S1 having a columnar shape, which accommodates one valve body 30. In the present embodiment, the partition wall portion 37 and a part of the outer peripheral wall portion 36 surround the side surface 30c of the valve body 30 to form the accommodation space S1. Further, in the present embodiment, one partition wall portion 37 in which one valve body 30 is accommodated and another partition wall portion 37 in which another valve body 30 disposed adjacently to the one valve body 30 is accommodated are formed integrally. In this way, the partition wall portions 37 accommodating therein different valve bodies 30 may have a shared portion.

In the present embodiment, with respect to the inner wall surface 32b of the bottom wall portion 32, the end surface 36a of the outer peripheral wall portion 36 on the cover 31 side is disposed at a position higher than the end surfaces 37a of the partition wall portions 37 on the cover 31 side in the facing direction. Thus, in a state where the cover 31 is fixed to the case 29, the cover 31 is in contact with the end surface 36a of the outer peripheral wall portion 36, but the cover 31 and the end surfaces 37a of the partition wall portions 37 are spaced from each other. Thus, a space S2 is formed between the cover 31 and the end surfaces 37a of the partition wall portions 37. The space S2 serves as a flow path of gas flowing into the inside of the pressure control valve 12 from the internal spaces V.

The valve body 30 (elastic valve body) is accommodated in the accommodation space S1 so as to closes the through hole 33. The valve body 30 is a columnar member formed of an elastic member such as rubber. The valve body 30 includes a first end surface 30a that closes the through hole 33 on the inner wall surface 32b side of the bottom wall portion 32, a second end surface 30b opposite from the first end surface 30a, and the side surface 30c that connects the first end surface 30a and the second end surface 30b. The second end surface 30b is a surface to be pressed by the cover 31. The valve body 30 closes the through hole 33 with the first end surface 30a pressed against the inner wall surface 32b of the bottom wall portion 32. The valve body 30 opens and closes the through hole 33 depending on the pressure in the internal space V. A gap G is formed between the side surface 30c of the valve body 30 and the inner wall surface 37b of the partition wall portion 37, or the side surface 30c of the valve body 30 and the inner wall surface 36b of the outer peripheral wall portion 36.

As illustrated in FIGS. 5 and 7, a plurality of protruded portions 38 for positioning the valve body 30 are formed in the inner wall surface 37b of the partition wall portion 37. The protruded portions 38 protrudes radially inwardly from the inner wall surface 37b of the partition wall portion 37. The protruded portions 38 extend over the entire inner wall surface 37b of the partition wall portion 37 along the direction in which the central axis of the through hole 33 extends (X-axis direction). The protruded portions 38 are configured to be placed in contact with the side surface 30c of the valve body 30. With the protruded portions 38 placed in contact with the valve body 30, the central portion of the valve body 30 and the central axis of the through hole 33 may coincide with each other. The protruded portions 38 restrict the displacement of the valve body 30 within a certain range. In the present embodiment, a plurality of protruded portions 38 (six protruded portions 38 illustrated in the drawing) are formed at constant pitches around the central axis of the through hole 33.

As illustrated in FIG. 7, a sealing portion 39 (projection) protruding outwardly from the inner wall surface 32b is formed in the inner wall surface 32b of the bottom wall portion 32 in the accommodation space S1. That is, the sealing portion 39 is surrounded by the partition wall portion 37 as viewed from the facing direction. Further, a plurality of sealing portions 39 are collectively surrounded by the outer peripheral wall portion 36. As described above, since one pressure control valve 12 is attached to the two mounting areas 24 in the configuration of the one example, the sealing portions 39 are disposed separately in one side and the other side of the center in the Y direction. The partition wall portions 37 surrounding the sealing portions 39 disposed on the one side of the center in the Y direction, and the partition wall portions 37 surrounding the sealing portions 39 disposed on the other side of the center in the Y direction are spaced from each other at the center in the Y direction. Further, the sealing portions 39 disposed adjacently to each other in the Y direction are arranged at positions shifted from each other in the Z direction.

The sealing portion 39 is placed in contact with the first end surface 30a of the valve body 30 pressed against the sealing portion 39, so that the clearance between the through hole 33 and the gap G may be opened and closed by the sealing portion 39. The sealing portion 39 is formed so as to surround an open end of the through hole 33 at the inner wall surface 32b. The sealing portion 39 is formed in an annular shape extending along the edge portion of the through hole 33 around the central axis of the through hole 33. The sealing portion 39 is formed so as to surround the entire circumference of the through hole 33 without a gap. Accordingly, the sealing portion 39 is in contact with the first end surface 30a of the valve body 30 without a gap, thereby securing airtightness.

As illustrated in FIGS. 5 and 7, the case 29 has connecting wall portions 40 to which the edge portion of the cover 31 extending along a pair of notches 31a (which will be described later) formed in the cover 31 is welded (connected). In one example, the connecting wall portions 40 are formed on the opposite corners in a diagonal direction as viewed from the facing direction. The connecting wall portions 40 are integrally formed with the outer peripheral wall portion 36. End surfaces 40a of the connecting wall portions 40 on the cover 31 side are formed in the same plane with the end surface 36a of the outer peripheral wall portion 36.

The cover (lid) 31 is a plate-like member that closes the opening of the case 29. The cover 31 is made of a resin such as PP, PPS, or modified PPE. In one example, the cover 31 may be formed by injection molding. As illustrated in FIG. 8, the pair of notches 31a is formed in the cover 31, which corresponds to the connecting wall portions 40 of the case 29. A position of a portion of an outer peripheral edge portion of the cover 31 other than the edge portion along the notches 31a substantially coincides with a position of the outer peripheral edge portion of the case 29 (the outer edge portion of the outer peripheral wall portion 36).

The cover 31 is connected to the open end surface of the case 29 by welding. Specifically, portions of the edge portion 42 of the cover 31 along the notches 31a are welded to the end surface 40a of the connecting wall portion 40, and a portion of the edge portion 42 other than the portion thereof along the notch 31a is welded to the end surface 36a of the outer peripheral wall portion 36. The edge portion 42 of the cover 31 is connected to the open end surface of the case 29 by, for example, ultrasonic welding.

The cover 31 has a discharge port 41 through which gas in the pressure control valve 12 is discharged to the outside of the pressure control valve 12. In the present embodiment, as an example, the discharge port 41 having a rectangular shape is provided at the center of the cover 31 in the Y direction. The discharge port 41 is disposed so as not to overlap the valve body 30 as viewed from the facing direction.

The cover 31 has a flat inner surface 43 that presses the second end surface 30b of the valve body 30. Each valve body 30 is compressed by the inner surface 43 towards its associated sealing portion 39. In one example, the inner surface 43 of the cover 31 may correspond to an area surrounded by the edge portion 42 of the cover 31. The cover 31 has a reinforcing portion 50 (a thick-walled portion) for reinforcing the cover 31 in an outer surface 45 opposite from the inner surface 43. In one example, the cover 31 is made partially thick to form the reinforcing portion 50. Specifically, the reinforcing portion 50 is formed protruding outwardly from the outer surface 45 so that a distance from the inner surface 43 to a protruded end of the reinforcing portion 50 is greater than that to the outer surface 45 in the thickness direction of the cover 31. The thickness direction coincides with the compression direction of the valve body 30. The reinforcing portion 50 may include a first reinforcing portion that extends along the outline of the cover 31 and a second reinforcing portion formed in an area surrounded by the first reinforcing portion as viewed from the compression direction of the valve body 30 (i.e., the direction in which case 29 and the cover 31 face).

In the illustrated example, it is illustrated that the reinforcing portion 50 includes a plurality of reinforcing portions 51 extending in the Z direction along the short sides of the cover 31, and a pair of reinforcing portions 52 extending in the Y direction along the long sides of the cover 31. Further, a reinforcing portion 53 is formed along each of the notches 31a in the illustrated example. The reinforcing portion 53 extends in an oblique direction that crosses the Z direction and the Y direction. In one example, the edge portion 42 is formed in the outer peripheries of the reinforcing portions 52 and the reinforcing portions 53. That is, the reinforcing portions 52 and the reinforcing portions 53 are formed along the to outline of the cover 31 as viewed from the X direction. The reinforcing portions 52 and the reinforcing portions 53 each correspond to a first thick-walled portion. The reinforcing portions 51 are formed in an area surrounded by the reinforcing portions 52 and the reinforcing portions 53 so as to connect one of the reinforcing portions 52 and the other of the reinforcing portions 52. The reinforcing portions 51 each correspond to a second thick-walled portion. In addition, the thicknesses of the reinforcing portions 51, the reinforcing portions 52, and the reinforcing portions 53 (the distances from the outer surface 45 to the respective end surfaces of the reinforcing portions) are equal to each other, and the end surfaces of the reinforcing portions 51, the end surfaces of the reinforcing portions 52, and the end surfaces of the reinforcing portions 53 are formed on the same plane on the side of the outer surface 45 of the cover 31. The thicknesses of the reinforcing portions 51, the reinforcing portions 52, and the reinforcing portions 53 may vary from each other. In such a case, there may be a step at boundaries between the reinforcing portions 51, the reinforcing portions 52, and the reinforcing portions 53 in the outer surface 45 of the cover 31. The reinforcing portions 51 need not necessarily extend in parallel with the Z direction, but may extend in an oblique direction that crosses the Z direction and the Y direction.

As illustrated in FIG. 8, identification information 55 is provided on the outer surface 45 of the cover 31. The identification information 55 may be used for the individual identification of the power storage module 2 to which the pressure control valve 12 is mounted. In one example, the identification information 55 may be a letter, a symbol, a barcode, a two-dimensional barcode (QR code (Registered Trademark)), or the like, which is readable by an optical means. The identification information 55 may be printed with ink or drawn by a laser or the like. A sticker on which the identification information 55 is printed may be stuck on the outer surface 45 of the cover 31.

As illustrated in FIG. 9, the position of the reinforcing portion 50 and the positions of the sealing portions 39 are shifted from each other as viewed from the compression direction of the valve body 30. That is, each of the reinforcing portions 51 extends in the Z direction and through between the sealing portions 39 disposed adjacently to each other in the Y direction as viewed from the compression direction. It is noted that paired reinforcing portions 51 are formed between the sealing portions 39 disposed adjacently to each other at the center in the Y direction and the discharge port 41 is formed between the paired reinforcing portions 51. In addition, the sealing portions 39 are disposed between the paired reinforcing portions 52 extending in the Y direction. The reinforcing portions 53 are provided for the sealing portions 39 disposed on the opposite ends in the Y direction and positioned at one side and the other side of the cover 31 in the Z direction. In one example, the whole sealing portion 39 protruding from the inner wall surface 32b need not be necessarily displaced from the reinforcing portion 50 as long as at least a part of the sealing portion 39 that may be in contact with the first end surface 30a of the valve body 30 is shifted from the reinforcing portion 50.

According to the above-described structure of the pressure control valve 12, in each of the plurality of valve bodies 30, the first end surfaces 30a are placed in contact with their associated sealing portions 39 surrounding the through holes 33 (communication hole 49) with the second end surfaces 30b of the respective valve bodies 30 pressed by the cover 31. Accordingly, the first end surfaces 30a of the valve bodies 30 and their associated sealing portions 39 are placed in close contact, so that the through holes 33 may be closed by their associated valve bodies 30. The through holes 33 of the case 29 communicate with the internal spaces V of the module main body 11 through the through hole 26 of the second sealing portion 23 and the through hole 25 of the first sealing portion 22. When the pressure in the internal space V is lower than a set pressure, a closed valve state where the through hole 33 is closed by the valve body 30 is maintained. When the pressure in the internal space V is greater than the set pressure, the valve body 30 is elastically deformed so as to be separated from the bottom wall portion 32, which results in a valve open state where the closing of the through hole 33 is released. As a result, gas from the internal space V flows to the space S2 formed between the partition wall portion 37 and the cover 31 through the gap G (accommodation space S1) between the side surface 30c of the valve body 30 and the inner wall surface 37b of the partition wall portion 37. Then, the gas is discharged from the space 32 to the outside of the pressure control valve 12 through the discharge port 41.

In the pressure control valve 12 having this configuration, the valve opening pressures of all the valve bodies 30 preferably fall within a certain range. Since the valve opening pressures of the valve bodies 30 change depending on the degrees of compression of the valve bodies 30, the distances from the sealing portions 39 formed in the inner wall surface 32b of the bottom wall portion 32 to the inner surface 43 of the cover 31 are required to be equal among the sealing portions 39 when the valve bodies 30 having the same shape and size are used. However, in a case where warping of the cover 31 occurs, the distances from the sealing portions 39 to the inner surface 43 of the cover 31 may vary among the sealing portions 39.

According to the pressure control valve 12 of one aspect, warping of the cover 31 is suppressed by the provision of the reinforcing portion 50 in the outer surface 45 of the cover 31 having the inner surface 43 that presses the valve bodies 30. The deformation of the inner surface 43 of the cover 31 is thus suppressed, so that the valve bodies 30 may be equally pressed.

In a case where the cover 31 is formed by the injection molding, a sink mark may be formed in the reinforcing portion 50 that is formed thick. In this case, if the inner surface 43 corresponding to the reinforcing portion 50 faces the sealing portion 39, the distances from the sealing portions 39 to the inner surface 43 may vary. According to the pressure control valve 12 of one aspect, the position of the reinforcing portion 50 and the positions of the sealing portions 39 are shifted from each other as viewed from the compression direction of the valve body 30. In this configuration, the valve bodies 30 are pressed by the inner surface 43 corresponding to the portion of the cover 30 where the reinforcing portion 50 is not formed. Even if a sink mark is formed in the reinforcing portion 50, this configuration prevents the sink mark from affecting the valve opening pressure.

The reinforcing portion 50 includes the reinforcing portions 51 extending in the Z direction and the reinforcing portions 52 extending in the Y direction as viewed from the compression direction. The reinforcing portion 50 includes the reinforcing portions 53 that extend in an oblique direction that crosses both the Z direction and the Y direction, as viewed from the compression direction. According to this configuration, the reinforcing portions 51 suppress warping in the Z direction, the reinforcing portions 52 suppress warping in the Y direction, the reinforcing portions 53 suppress warping in the direction that crosses both the Z direction and the Y direction. Thus, warping in the cover 31 may be effectively suppressed by reducing warping in the different directions in this way.

The reinforcing portions 52 and the reinforcing portions 53 forming the reinforcing portion 50 are formed extending along the outline of the cover 31. This configuration permits effectively suppressing deformation of the outline of the cover 31. In addition, since the reinforcing portions 51 are formed in the area surrounded by the reinforcing portions 52 and the reinforcing portions 53, the reinforcing portions 51 effectively suppress deformation of the central portion of the cover 31.

The identification information 55 is provided in a part of the outer surface 45 of the cover 31 surrounded by the reinforcing portion 50. That is, the identification information 55 is provided in the surface of the cover 31 where the reinforcing portion 50 is not formed. In this configuration, individual identification of the power storage module 2 to which the pressure control valve 12 is mounted may be made by using the identification information 55. Since the identification information 55 is formed in the surface that is recessed relative to the reinforcing portion 50, the identification information 55 may be protected from dart, or the like. In addition, the identification information 55 is less likely to be damaged.

Although the embodiment of the present disclosure has been described in detail with reference to the drawings, the configuration is not limited to this embodiment.

Although a space formed between the electrodes of the bipolar battery has been described as an example of the internal space formed in the power storage module, the internal space of the power storage module is not limited to this. For example, the internal space may be any space of one cell of a power storage module. In the internal space, a plurality of positive electrodes, a plurality of negative electrodes, a plurality of separator, and an electrolyte may be disposed.

Although the configuration in which one pressure control valve 12 is provided for two mounting areas 24 has been described in one example, one pressure control valve may be provided for one mounting area. Alternatively, one pressure control valve 12 may be mounted to the four mounting areas.

Although the configuration in which the case 29 forming the pressure control valve 12 is mounted to the frame 16 of the module main body 11 has been described, for example, the frame of the module main body and the case of the pressure control valve may be formed integrally by injection molding.

The shape of the accommodation space S1 in which the valve body 30 is accommodated is not limited to a substantially circular shape in cross section, but may be a polygonal shape such as a tetragon and a hexagon.

What is claimed is:

1. A pressure control valve structure used for a power storage module having a plurality of internal spaces, the pressure control valve structure comprising:
a bottom wall portion having a plurality of communication holes communicating with their associated internal spaces;
a plurality of projections, each in a circular shape, protruding outwardly from an inner wall surface of the bottom wall portion so as to surround their associated communication holes;
a plurality of elastic valve bodies each having a first end surface and a second end surface opposite from the first end surface, the elastic valve bodies closing their associated communication holes with the first end surfaces of the elastic valve bodies placed in contact with the projections;
an outer peripheral wall portion protruding from the inner wall surface so as to surround the plurality of projections collectively; and
a cover made of a resin and fixed to the outer peripheral wall portion, the cover having a flat inner surface that presses the second end surface of the elastic valve bodies so as to compress the elastic valve bodies towards their associated projections, wherein
the cover has a thick-walled portion where the cover is made partially thick, the thick-walled portion being formed protruding outwardly from an outer surface of the cover opposite from the flat inner surface so that a distance from the inner surface to a protruded end of the thick-walled portion is greater than a distance from the inner surface to the outer surface in a thickness direction of the cover,
the cover has a discharge port through which gas in the pressure control valve structure is discharged to an outside of the pressure control valve structure, the discharge port being formed in the outer surface of the cover,
wherein the thick-walled portion includes first thick-walled portions that extend along an outline of the cover as viewed from a compression direction of the elastic valve bodies,
a plurality of connecting projections each having a lattice-frame shape are formed in an outer wall surface of the bottom wall portion, and are spaced apart from each other in a direction in which the valve bodies are arranged so that a spaced portion is provided between connecting projections in the direction in which the valve bodies are arranged;
the discharge port is formed in the cover so as to face a location where the spaced portion is provided.

2. The pressure control valve structure according to claim 1, wherein
the thick-walled portion further includes second thick-walled portions, the second thick-walled portions are formed to connect the first thick-walled portions extending in a longitudinal direction of the pressure control valve,
the discharge port being disposed between a pair of the second thick-walled portions.

3. The pressure control valve structure according to claim 2, wherein
positions of each of the second thick-walled portions are shifted from the positions of all of the plurality of projections.

4. The pressure control valve structure according to claim 2, wherein
an identification information is provided on the outer surface of the cover, the identification information being provided in a part of the outer surface surrounded by the thick-walled portion as viewed from the compression direction.

5. A power storage module comprising:
the pressure control valve structure according to claim 1.

6. The pressure control valve structure according to claim 2, wherein the position of the second thick-walled portions and the positions of the plurality of projections are shifted from each other as viewed from the compression direction.

7. The pressure control valve structure according to claim 1, wherein
a notch is provided in an outer corner of an outer peripheral edge portion of the cover, so that the outer corner having the notch does not overlap with the outer peripheral wall portion.

8. A pressure control valve structure used for a power storage module having a plurality of internal spaces, the pressure control valve structure comprising:
a bottom wall portion having a plurality of communication holes communicating with their associated internal spaces;
a plurality of projections, each in a circular shape, protruding outwardly from an inner wall surface of the bottom wall portion so as to surround their associated communication holes;
a plurality of elastic valve bodies, each of the elastic valve bodies closing their associated communication holes and in contact with the plurality of projections;
an outer peripheral wall portion protruding from the inner wall surface so as to surround the plurality of projections collectively;
a plurality of connecting projections each having a lattice-frame shape are formed in an outer wall surface of the bottom wall portion, and are spaced apart from each other in a direction in which the valve bodies are arranged so that a spaced portion is provided between connecting projections in the direction in which the valve bodies are arranged; and
a cover made of a resin and fixed to the outer peripheral wall portion, the cover having a flat inner surface that presses the elastic valve bodies so as to compress the elastic valve bodies towards their associated projections,
wherein the cover has a discharge port through which gas in the pressure control valve structure is discharged to an outside of the pressure control valve structure, the discharge port being formed in an outer surface of the cover so as to face a location where the spaced portion is provided.

* * * * *